United States Patent [19]

Kameyama

[11] Patent Number: 5,722,779
[45] Date of Patent: Mar. 3, 1998

[54] BEARING UNIT

[75] Inventor: Fumio Kameyama, Nagoya, Japan

[73] Assignee: Brother Kogyo Kabushiki Kaisha, Aichi-ken, Japan

[21] Appl. No.: 734,382

[22] Filed: Oct. 17, 1996

[30] Foreign Application Priority Data

Oct. 17, 1995 [JP] Japan .................... 7-268840

[51] Int. Cl.$^6$ .................................... F16C 33/76
[52] U.S. Cl. ........................... 384/478; 384/480
[58] Field of Search ..................... 384/132, 133, 384/134, 478, 480

[56] References Cited

U.S. PATENT DOCUMENTS

| | | | |
|---|---|---|---|
| 2,125,446 | 8/1938 | Hurtt | 384/134 |
| 3,090,654 | 5/1963 | Wald et al. | 384/134 |
| 3,452,839 | 7/1969 | Swearington | 384/134 |
| 5,074,408 | 12/1991 | Smith et al. | 384/478 |

*Primary Examiner*—Lenard A. Footland
*Attorney, Agent, or Firm*—Kane,Dalsimer,Sullivan,Kurucz,Levy,Eisele and Richard, LLP

[57] ABSTRACT

A bearing unit includes two pairs of bearings, a housing for housing the bearings and a flange through which the shaft is inserted. In order to prevent the invasion of cutting chips or cutting oil into the bearings, the flange is provided with a circumferential groove on the inner surface of the flange, and an air supply port which opens in the circumferential groove for introducing compressed air to the groove. The axial direction of the supply port is parallel to a tangent of the shaft, so that the compressed air is effectively introduced in the circumferential direction of the shaft. Therefore, the air blow created by the compressed air in the clearance becomes uniform along the circumference of the shaft, which enables to effectively prevent the invasion of cutting chips and cutting oil.

17 Claims, 3 Drawing Sheets

BEARING UNIT

BACKGROUND OF THE INVENTION

The present invention relates to a bearing unit used in machines such as machining tools or the like.

A bearing unit includes bearings for rotatably supporting a shaft and a housing which houses the shaft and the bearings. A flange is mounted to the housing in such a manner that one end of the shaft is inserted therein, for securing the bearings to the housing.

In order to prevent the invasion of cutting chips or cutting oil into the bearings, the flange is provided with an air supply port which opens at the inner surface of the flange. The air supply port introduces compressed air to a clearance between the outer surface of the shaft and the inner surface of the flange. The compressed air introduced to the clearance creates annual air blow which prevents the invasion of cutting chips and cutting oil.

Conventionally, the air supply port is made so that the axis of the air supply port is perpendicular to the outer surface of the shaft. Accordingly, the compressed air impinges on the outer surface of the shaft and is dispersed in the circumferential and axial direction of the shaft. Thus, the compressed air is not sufficiently introduced throughout the circumference of the shaft, and therefore the air blow is not uniform along the circumference of the shaft. For example, the air blow is particularly weak at a portion opposite to the air supply port. If the air blow is not uniform along the circumference of the shaft, it allows the invasion of cutting chips or cutting oil into the bearings through the portion where the air blow is weak, which may cause the breakage of the bearings.

In case where several air supply ports are provided to the flange, it may increase complexity of the bearing unit and raise the manufacturing cost.

SUMMARY OF THE INVENTION

It is therefore an object of the present invention to provide an improved bearing unit capable of preventing the invasion of cutting chips or cutting oil through the clearance between the shaft and the flange.

According to an aspect of the present invention, a bearing unit includes; at least one bearing for rotatably supporting a shaft; a housing for housing the bearing; and a flange mounted to the housing in such a manner that one end of the shaft is inserted into the flange. The flange is provided with a fluid supply port which opens at the inner surface of the flange for introducing a fluid to a clearance between the shaft and the flange, and the axial direction of the supply port is essentially parallel to a tangent of the outer surface of the shaft.

Since the axial direction of the supply port is essentially parallel to a tangent of the shaft, the fluid is mostly introduced in the circumferential direction of the shaft. That is, the fluid is sufficiently introduced throughout the circumference of the shaft. Therefore, the blow created by the introduced fluid in the clearance becomes uniform along the circumference of the shaft, which enables to effectively prevent the invasion of cutting chips and cutting oil.

Preferably, at least one seal member is provided between the supply port and the bearings, so that the invasion of cutting chips and cutting oil into the bearings is further prevented. Advantageously, the seal member is a labyrinth seal.

In a particular arrangement, the fluid supply port opens in a circumferential groove formed on the inner surface of the flange, so that the fluid is further sufficiently introduced throughout the circumference of the shaft. Preferably, the fluid is compressed air, so that the fluid can flow outside the housing without making the circumference dirty. Further preferably, at least one seal member is provided between mating surfaces of the flange and the housing, so as to prevent the leak of lubricant oil used in the bearings. Optionally, at least one positioning pin is provided for positioning the flange with respect to the shaft, so that the clearance between the shaft and the flange is uniform along the circumference of the shaft.

In a further development of this aspect of the present invention, the flange has a circumferential groove on the inner surface of the flange, and a fluid supply port which opens in the groove for introducing a fluid to the groove.

Since the fluid is introduced into the groove formed in the circumferential direction of the shaft, the fluid is effectively introduced throughout the circumference of the shaft.

In a particular arrangement, the axial direction of the supply port is essentially parallel to a tangent of the shaft, so that the fluid is further effectively introduced into the groove. Preferably, at least one seal member is provided between the groove and the bearings.

DESCRIPTION OF THE ACCOMPANYING DRAWINGS

DESCRIPTION OF THE EMBODIMENT

The embodiment of the present invention is described with reference to the accompanying drawings.

Figure 1:
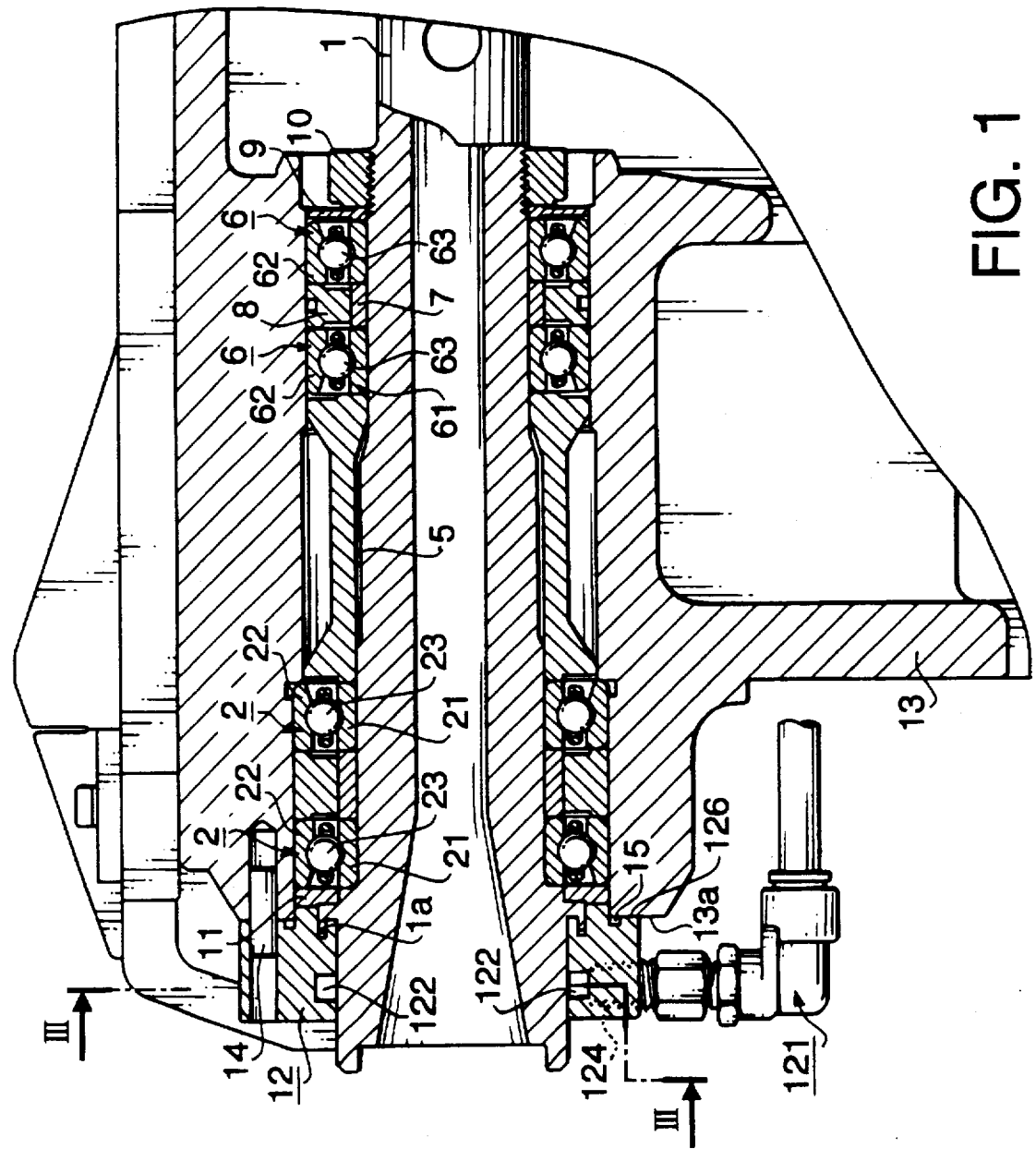
FIG. 1 is a sectional view of a machining tool in which a bearing unit of the invention is employed.
Figure 2:
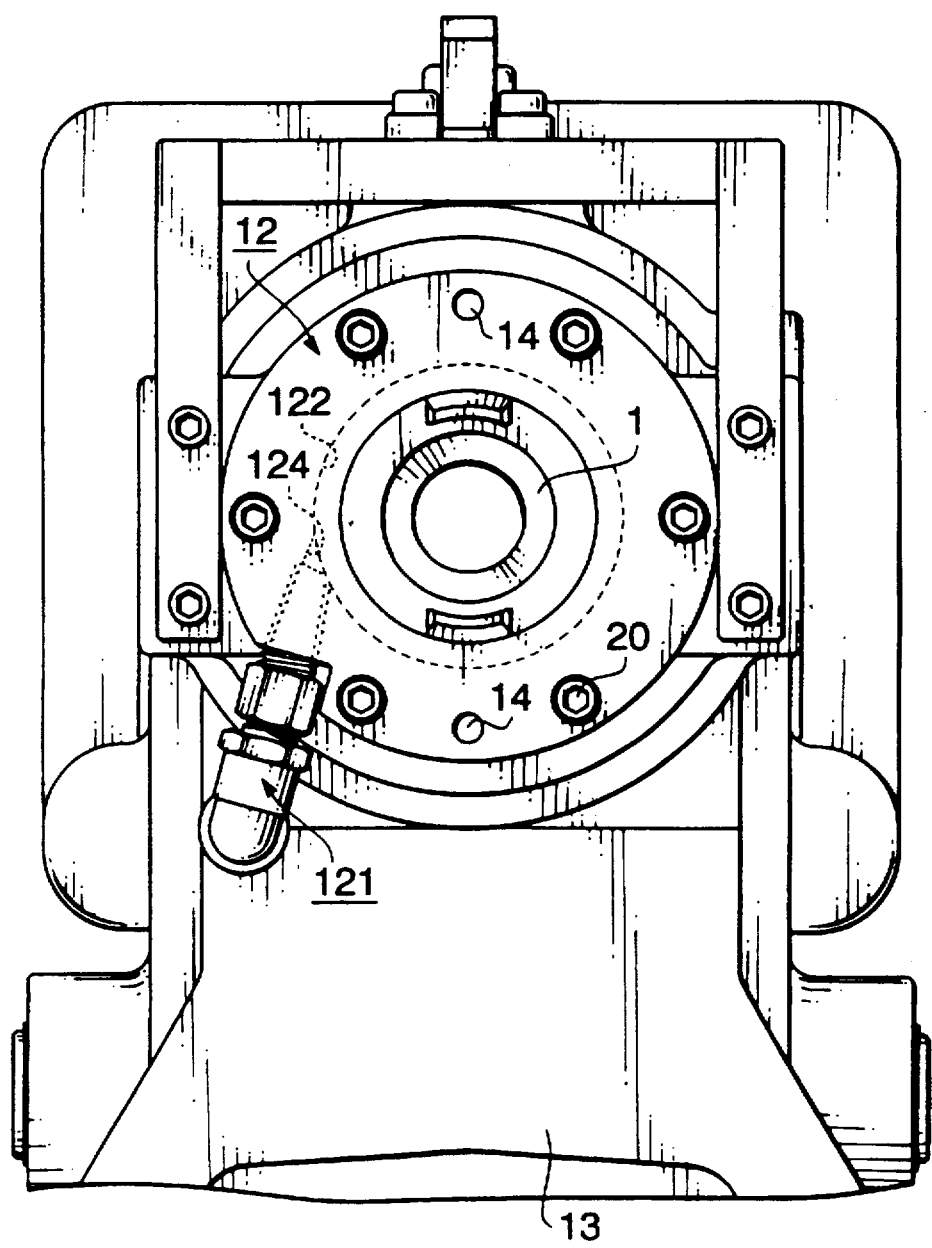
FIG. 2 is a front view of the machining tool of FIG. 1.

FIGS. 1 and 2 are a sectional view and a front view of a machining tool in which a bearing unit embodying the invention is employed.

As shown in FIG. 1, the bearing unit includes two pairs of bearings 2, 2 and 6, 6 for rotatably supporting a shaft 1 and a housing 13 which houses the bearings 2, 2 and 6, 6.

Each bearing 2 (6) includes an inner ring 21 (61) fixed to the shaft 1, an outer ring 22 (62) fixed to the housing 13, and balls 23 (63) provided between the inner ring 21 (61) and the outer ring 22 (62).

A flange 12 and a lock nut 10 are provided to the housing 13, for axially sandwiching the bearings 2 and 6 via several spacers (described later) thereby to axially fix the bearings 2 and 6 to the housing 13. The flange 12 is mounted to the housing 13 via screws 20 in such a manner that an end portion of the shaft 1 is inserted therein, and a flange shoulder 126 of the flange 12 abuts a housing shoulder 13a of the housing 13. The lock nut 10 has an internal thread which engages an external thread formed on the shaft 1.

A spacer 3 (7) is fixed to the shaft 1 between two inner rings 21 (61), a spacer 4 (8) is fixed to the housing 13 between two outer rings 22 (62), and a spacer 5 is fixed to the shaft 1 between the bearings 2 and 6. Accordingly, the bearings 2, 2 and 6, 6 are axially positioned by fixing the flange 12 to the housing 13 and by fixing the lock nut 10 to the shaft 1.

In order to prevent the invasion of cutting chips or cutting oil into the bearings 2 and 6, labyrinth seals 11 and 9 are provided at both longitudinal sides of the bearings 2 and 6.

The labyrinth seal 11 is fixed at the outer side (left side) of the bearings 2, by securing the flange 12 to the housing 13. The labyrinth seal 9 is fixed to the inner side (right side) of the bearings 6, by fixing the lock nut 10 to the shaft 13. Further, a packing 15 is provided between the housing shoulder 13a and the flange shoulder 12b. The shaft 1 has a labyrinth portion 1a at the outer side (left side) of the bearings 2. As shown in FIG. 2, the flange 12 has a pair of positioning pins 14, 14 for positioning the flange 12 so that the clearance between the inner surface of the flange 12 and the outer surface of the shaft 1 is uniformly formed along the circumference of the shaft 1.

A circumferential groove 122 is formed on the inner surface of the flange 12, which forms an air channel along the circumference of the shaft 1.

An air supply line 121 is provided to the flange 12, which has an air supply port 124 opening in the groove 122. The air supply line 121 is connected to a compressor (not shown), for introducing compressed air into the groove 122. The compressed air introduced into the groove 122 creates the annual air blow in the clearance.

Figure 3:
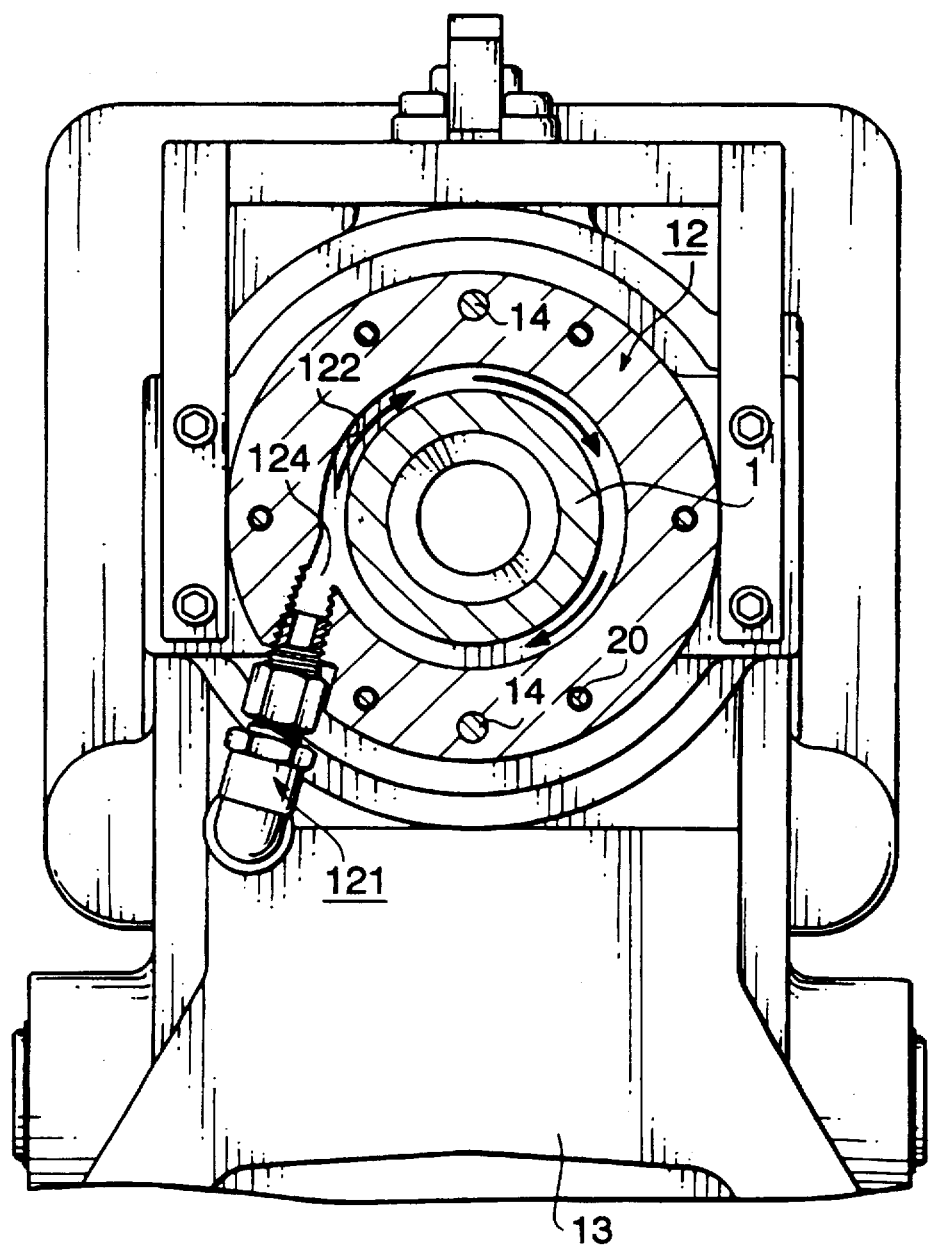
FIG. 3 is a sectional view taken along the line III—III of FIG. 1.

FIG. 3 is a sectional view taken along the line III—III of FIG. 1. As shown in FIG. 3, the air supply port 124 is provided in such a manner that the axis of the air supply port 124 is parallel to a tangent of the outer surface of the shaft 1.

Since the compressed air is introduced in parallel with a tangent of the shaft 1, and since the compressed air flows along the groove 122, the compressed air is sufficiently introduced throughout the circumference of the shaft 1. Thus, the air blow created by the compressed air becomes uniform along the circumference of the shaft 1, and therefore, the invasion of cutting chip and cutting oil is effectively prevented.

Since the labyrinth portion 1a, labyrinth seal 11 and bearings 2 are provided between the groove 122 and the bearings 2, the air blow in the clearance is mostly directed toward outside of the housing 13 (left side), thereby to prevent the invasion of cutting chips and cutting oil.

As described above, according to this embodiment, since the compressed air is sufficiently introduced throughout the circumference of the shaft 1, the air blow in the clearance between the shaft 1 and the flange 12 becomes uniform along the circumference of the shaft 1, and therefore the invasion of cutting chip and cutting oil is effectively prevented.

The present disclosure relates to subject matter contained in Japanese Patent Application No. HEI 07-268840 filed on Oct. 17, 1995, which are expressly incorporated herein by reference in their entirety.

What is claimed is:

1. A bearing unit comprising;
   at least one bearing for rotatably supporting a shaft;
   a housing for housing said bearing; and
   a flange mounted to said housing in such a manner that one end of said shaft is inserted into said flange,
   wherein said flange is provided with a fluid supply port which opens at the inner surface of said flange for introducing a fluid to a clearance between said shaft and said flange, and the axial direction of said supply port is essentially parallel to a tangent of the outer surface of said shaft.

2. The bearing unit according to claim 1, further comprising at least one seal member provided between said supply port and said bearings.

3. The bearing unit according to claim 2, wherein said seal member is a labyrinth seal.

4. The bearing unit according to claim 1, wherein said flange has a circumferential groove on the inner surface of said flange, and said fluid supply port opens in said groove.

5. The bearing unit according to claim 1, wherein said fluid is compressed air.

6. The bearing unit according to claim 1, further comprising at least one seal member provided between mating surfaces of said flange and said housing.

7. The bearing unit according to claim 1, further comprising at least one positioning pin for positioning said flange with respect to said shaft.

8. The bearing unit according to claim 1, wherein said flange has a circumferential groove on the inner surface of said flange, said fluid supply port opens in said groove, and at least one seal member is provided between said groove and said bearings.

9. A bearing unit comprising:
   at least one bearing for rotatably supporting a shaft, said shaft having an outer surface;
   a housing for housing said bearing; and
   a flange mounted to said housing in such a manner that one end of said shaft is inserted into said flange,
   wherein said flange has a circumferential groove on the inner surface of said flange, and a fluid supply port which opens in said groove for introducing a fluid to said groove, said supply port having an axial direction essentially parallel to a tangent to the outer surface of said shaft.

10. The bearing unit according to claim 9, further comprising at least one positioning pin for positioning said flange with respect to said shaft.

11. The bearing unit according to claim 9, further comprising at least one seal member provided between said groove and said bearings.

12. The bearing unit according to claim 11, wherein said seal member is a labyrinth seal.

13. The bearing unit according to claim 9, wherein said fluid is compressed air.

14. The bearing unit according to claim 9, further comprising at least one seal member provided between mating surfaces of said flange and said housing.

15. A bearing unit comprising;
   at least one bearing for rotatably supporting a shaft;
   a housing for housing said bearing; and
   a flange mounted to said housing in such a manner that one end of said shaft is inserted into said flange,
   said flange having a circumferential groove on the inner surface of said flange and an air supply port which opens in said groove for introducing air to said groove,
   wherein the axial direction of said supply port is essentially parallel to a tangent of the outer surface of said shaft, and at least one seal member is provided between said groove and said bearings.

16. The bearing unit according to claim 15, further comprising at least one positioning pin for positioning said flange with respect to said shaft.

17. The bearing unit according to claim 15, wherein said seal member is a labyrinth seal.

* * * * *